United States Patent [19]

Lien et al.

[11] Patent Number: 4,594,696
[45] Date of Patent: Jun. 10, 1986

[54] GUN CABLE TERMINATION

[75] Inventors: Eldar K. Lien, Hosle; Sverre Caspersen, Oslo, both of Norway

[73] Assignee: Geophysical Company of Norway A.S., Hovik, Norway

[21] Appl. No.: 603,914

[22] Filed: Apr. 26, 1984

[30] Foreign Application Priority Data

May 13, 1983 [NO] Norway .................. 831705

[51] Int. Cl.⁴ .................. H04R 1/02; B63B 21/04; G01V 1/04; G01V 1/06
[52] U.S. Cl. .................. 367/144; 114/253; 181/118; 181/120
[58] Field of Search ............ 367/15, 19, 20, 79, 367/106, 130, 144, 153, 154, 191, 146, 169, 172; 174/70 S, 47, 101.5; 114/249, 253; 181/115, 117, 118, 119, 120

[56] References Cited

U.S. PATENT DOCUMENTS

| | | | |
|---|---|---|---|
| 3,997,230 | 12/1976 | Secretan | 367/154 X |
| 4,029,894 | 6/1977 | Jarvis et al. | 174/70 S |
| 4,038,630 | 7/1977 | Chelminski | 181/111 X |
| 4,092,629 | 5/1978 | Siems | 367/15 X |
| 4,281,402 | 7/1981 | Kruka et al. | 367/15 |
| 4,319,347 | 3/1982 | Savit | 367/79 X |
| 4,450,543 | 5/1984 | Neeley | 367/20 X |
| 4,525,813 | 6/1985 | Burrage | 367/144 X |

FOREIGN PATENT DOCUMENTS 2604477 8/1976 Fed. Rep. of Germany .
2609078 9/1977 Fed. Rep. of Germany .
3141593 1/1982 Fed. Rep. of Germany .
1571679 7/1980 United Kingdom .

*Primary Examiner*—Charles T. Jordan
*Assistant Examiner*—Brian S. Steinberger
*Attorney, Agent, or Firm*—Holman & Stern

[57] ABSTRACT

A means for terminating of splicing a cable intended for towing air-water guns behind a seismic vessel. The end of the cable, or of each cable section, is guided into the housing of the termination member. The termination is formed with separately located connection sites for the cable components. The cable's tension-relieving wires (3) are guided into a first chamber (I) in the housing and fastened to the supporting structure of the chamber (I), i.e., the housing. The chamber (I) is filled with a water-repellant lubricant. The cable's conductors (9) are guided individually through the first chamber (I) and through a sealed passage (10) in a wall (14) defining a second, watertight chamber (II) which is filled with an electrically insulating, hydrophobic, water-emulsifying liquid. The chamber (II) is also provided with a pressure compensator (8). The conductors (9) are guided further to underwater connectors (15) disposed in the diametrically opposed end wall (13) of the housing, optionally with an intermediate connection of electronics circuitry (16). The compressed air hose (17) of the cable is conducted through the first chamber (I) and through a central separate channel (18) in the second chamber (II) to a coupling (19) outside the housing.

16 Claims, 1 Drawing Figure

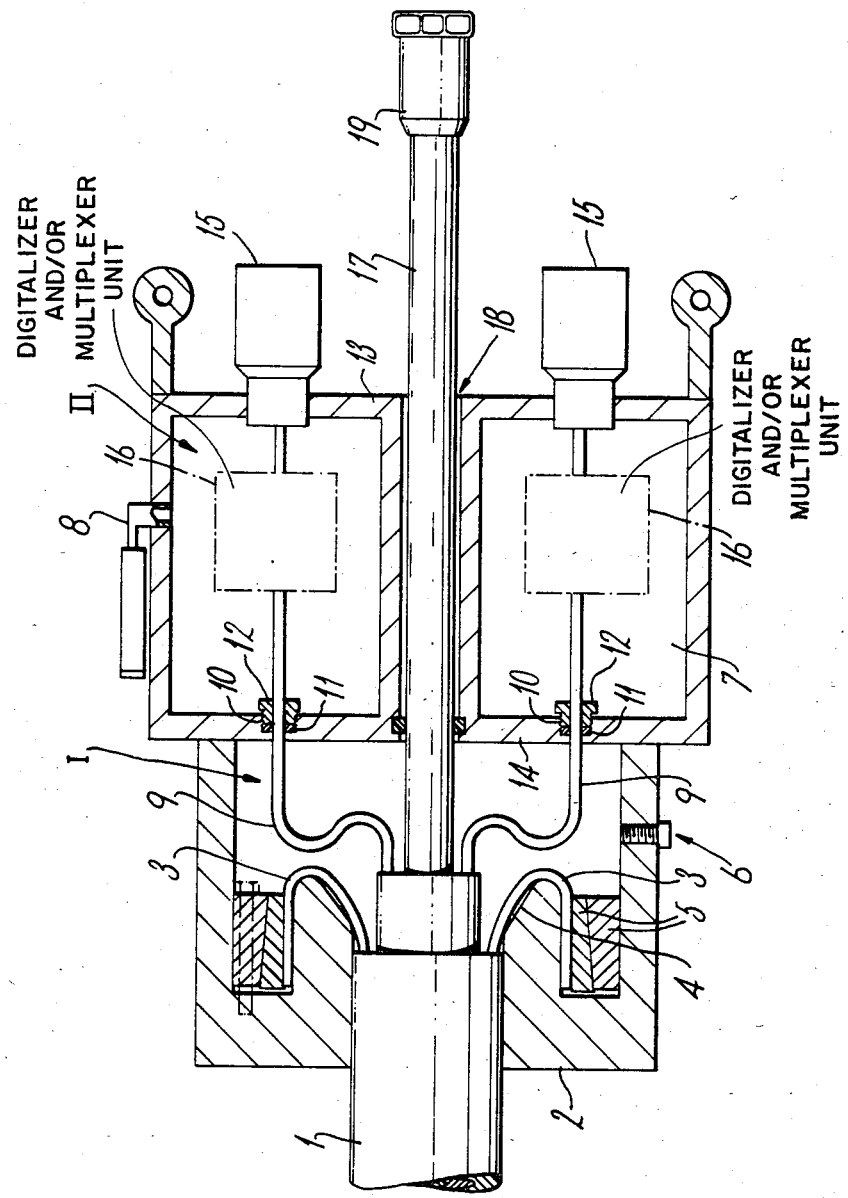

GUN CABLE TERMINATION

BACKGROUND OF THE INVENTION

1. Field of the Invention

The present invention relates to a device for terminating or splicing a cable used for towing air/water guns behind a seismic vessel, called a gun cable, which is described in Norwegian Patent Application No. 83 1546, corresponding to U.S. patent application Ser. No. 601,598, filed Apr. 18, 1984. The termination has the following main functions:

(a) It should be able to transmit peak load tensions of up to 10 tons from the cable to the towed gun array or to the next cable section in such a manner that only the reinforcing wire is subjected to loading;

(b) It should provide a watertight connection for transfer of the signals from the conductors in the cable to the associated conductors in the next cable section or in the guns via underwater connectors;

(c) It should be able to connect compressed air from the air hose in the cable to the guns, in such manner that any air which leaks out of the hose or coupling is released directly into the surrounding water without disturbing the other functions of the termination;

(d) It should also contain room for electronics in a watertight compartment.

2. Description of the Prior Art

Several methods are used today for terminating gun cables. They all comprise terminating the cable in one or two heads (called "bulkheads"). In at least one of these methods, a casting technique is utilized to obtain a watertight seal. It has proved to be very difficult to make good gun cable terminations, which is reflected among other things in the price of these assemblies. It is not uncommon for the termination alone to cost as much as a cable over 100 meters long. Experience has also shown that when faults occur, for example if the electrical signals become crossed in a gun cable having termination, the fault occurs at least as often in the termination as in the cable itself. There are several reasons why it is so difficult to make good gun cable terminations. The most important seems to be that during use, the termination is subjected to continuously variable mechanical loads, both from the tension in the reinforcing wire and from the pulsating pressure in the air hose. These mechanical stresses, in time, cause the casting in the bulkhead to "slip" or slide away from the materials to which it originally adhered. Thus openings arise which may gradually fill with water.

Another problem with present-day terminations is the choice of different casting materials. No single casting material exists which adheres to all of the various materials used in a termination and which at the same time can provide adequate watertightness over a lengthy period of time. Polyurethane is often used, but it does not provide the best seal against water penetration. Separate castings with other casting materials are often used around the individual conductors to ensure maximum adherence and sealing to the conductor insulation, but the construction then becomes more complex with even more interfaces between different materials.

BRIEF SUMMARY OF THE INVENTION

The object of the invention is to provide a new and improved solution to the above problems. This is obtained with a termination whose characterizing features comprise a termination which is especially adapted to the cable disclosed in Norwegian Patent Application No. 83 1546 and the corresponding U.S. Patent application referred to above. Through the very special construction of this termination, it is possible for the termination to fulfil all of its intended functions in a single bulkhead, and no casting at all is required. The latter is especially important in connection with service and maintenance. If a fault occurs in the termination (for example, water penetration), it is simple to disassemble the termination using common hand tools. Moreover, the water sealing ability of this new termination is at least as good as in existing cast terminations.

The invention must be considered in close conjunction with the cable construction (e.g., that shown in the Norwegian Application No. 83 1546 referred to above. In this cable, the water sealing function is taken care of solely by the insulation around each signal conductor, with some help from the vaseline filling the interstices between conductors, which hinders water migration along the cable. By utilizing the same ideas for the termination, it has been possible to obtain a reliable watertight seal in a simple manner.

BRIEF DESCRIPTION OF THE DRAWINGS

The invention is described below with reference to the accompanying drawing, which is a schematic cross sectional view showing a termination made in accordance with the invention.

DETAILED DESCRIPTION

The termination is made substantially of metal, i.e. stainless steel, and consists of two cylindrical compartments I and II.

The cable 1 enters the termination through an end wall 2 of the first chamber I. The reinforcement wires 3 are terminated in chamber I by bending them away from the cable and back over a conical ring 4, to which the wires are clamped with a clamp means 5 which may be secured with a bolt as indicated on the figure at the upper part of the clamp means. The chamber I is filled with vaseline which is retained with the aid of sealing rings, but there is no attempt to provide a completely watertight seal. A nipple 6 for filling chamber I with vaseline is provided.

The chamber II is the watertight chamber. It is filled with an electrically insulating liquid 7 with good water displacing hydrophobic and water emulsifying properties, e.g., "CRC 2-26". The chamber II is pressure compensated by means of a suitable, known per se means 8, i.e., the pressure of the liquid at all times is the same as the ambient water pressure outside the chamber. Electrical conductors 9 are guided from chamber I to chamber II via individual passages 10 through the partition wall 14 between the chambers, where a seal is obtained by radial gaskets 11 of artificial rubber which are clamped together against the conductor insulation and the wall material by means of a screw 12. At the opposite end 13 of chamber II are chassis-mounted underwater connectors 15 of commercial type. The conductors 9 from the cable can be soldered directly to these, or chamber II can also function as a housing for electronics 16 which intervene on the signal path between the connectors 15 and the conductors 9 in the cable. This electronics equipment digitalizes and multiplexes the signals.

The air hose 17 is conducted past chamber II in a pipe 18 and exits at the rear wall of the termination without coming into any contact with chamber II. The hose 17 is terminated by a conventional force-fit coupling 19 outside the termination.

The above invention makes it possible, in a simple manner, to obtain two absolutely essential properties on a gun cable termination:

(1) The termination provides a watertight seal without casting. This is obtained through the provision of a first vaseline-filled chamber which hinders water migration, the use of radial compression gaskets made of artificial rubber around each conductor at the passage through which the conductor enters the second, watertight chamber, the provision of pressure compensation in this chamber, and the use of a hydrophobic, water-emulsifying liquid in this chamber which ensures that if a small amount of water should manage to penetrate into this chamber, the chances are slight that the water could cause any damage;

(2) The sealing functions are unaffected by mechanical stresses on the termination. A construction has been achieved wherein neither pressure pulsations in the hose nor varying tension on the cable (causing movements of the cable in chamber I) have any influence on the seal in chamber II. This is obtained in that the hose is conducted in a pipe through the chamber II, and in that the conductors are guided individually through the passages leading to chamber II and therefore, owing to their flexibility, the conductors will absorb and dissipate any movements instead of propagating the movements into chamber II.

In addition to these fundamental properties, which are completely novel and which ensure a substantial prolongation of the life of a gun cable termination, the new termination also has other advantageous properties in combination with the gun cable disclosed in Norwegian Patent Application No. 83 1546 referred to above.

It has space for electronics, so that there is room to place all functions including electronics functions such as digitalizing and multiplexing in a single cable bulkhead, which simplifies handling and provides a robust construction.

The termination is simple to open for replacing electronics modules.

A final termination for connection to a gun array has been described above, merely by way of example. It should be understood, however, that a corresponding assembly could also be adapted for use in splicing cable sections, wherein two of the illustrated terminations can be connected to each other following modification of linkages such as connectors and means for transmitting tensile forces. The invention may also be used for terminating or splicing of cables with optical fiber conductors.

We claim:

1. A seismic gun-cable termination for attachment to an end of a seismic cable-gun used for towing air/water guns behind a seismic vessel, the cable including a pressure hose, signal conductors and tension wire, comprising:
    a connector housing;
    a first chamber and a second separate watertight chamber in said housing;
    a first wall in said housing forming one end of said first chamber;
    a second wall in said housing spaced from said first wall and disposed between and separating said chambers and forming on one side thereof one end of said second chamber;
    a third wall in said housing forming the other end of said second chamber opposite said first end thereof;
    a hole through said first wall for receiving the end of the gun-cable to be connected inserted therethrough;
    fastening means for fastening the tension wires of the gun-cable to said housing within said first chamber;
    sealed passages through said second wall for receiving inserted therethrough individually and in sealed relationship therewith the conductors extending through said first chamber and said second chamber;
    underwater connectors mounted in and extending through said third wall for connection with the conductors;
    a central separate channel in said housing through said second chamber for receiving the pressure hose extending therethrough from said first chamber through said second and third walls;
    a water-repellant lubricant filling said first chamber;
    a hydrophobic, water-emulsifying liquid filling said second chamber; and
    a pressure-compensating means operatively mounted on said housing in communication with said second chamber for controlling the pressure therein.

2. A termination as claimed in claim 1 wherein:
    said housing further comprises side wall means extending between said second and third walls forming an outer side wall of said second chamber; and
    said pressure-compensating means extends through said side wall means for maintaining the pressure in said second chamber the same as the ambient pressure outside said second chamber.

3. A termination as claimed in claim 1 wherein:
    said water-repellant liquid in said first chamber comprises vaseline.

4. A termination as claimed in claim 2 wherein:
    said water-repellant liquid in said first chamber comprises vaseline.

5. A termination as claimed in claim 1 and further comprising:
    radial compression gaskets of artificial rubber in said sealed passages through said second wall through which said conductors pass; and
    clamping screws for clamping and compressing said gaskets into sealing engagement with said passages and conductors.

6. A termination as claimed in claim 4 and further comprising:
    radial compression gaskets of artificial rubber in said sealed passages through said second wall through which said conductors pass; and
    clamping screws for clamping and compressing said gaskets into sealing engagement with said passages and conductors.

7. A termination as claimed in claim 1 wherein said fastening means comprises:
    a wedge-shaped annular projection extending inwardly from said first wall into said first chamber around the gun-cable adapted for having the tension wires bent thereon; and
    clamping means co-operatively associated with said housing for clamping said bent tension wires onto said annular projection.

8. A termination as claimed in claim 6 wherein said fastening means comprises:
    a wedge-shaped annular projection extending inwardly from said first wall into said first chamber around the gun-cable adapted for having the tension wires bent thereon; and clamping means co-operatively associated with said housing for clamping said bent tension wires onto said annular projection.

9. A termination as claimed in claim 1 and further comprising:

towing attachment means on said housing adjacent said third wall thereof.

10. A termination as claimed in claim 8 and further comprising:

towing attachment means on said housing adjacent said third wall thereof.

11. A termination as claimed in claim 1 wherein:
said conductors comprise electrical conductors.

12. A termination as claimed in claim 10 wherein:
said conductors comprise electrical conductors.

13. A termination as claimed in claim 1 wherein:
said second chamber is annular in shape;
said central separate channel comprises a tubular element of said housing forming the radially inner wall of said second chamber; and sealing means is provided between said pressure-hose and the interior wall of said tubular element.

14. A termination as claimed in claim 12 wherein:
said second chamber is annular in shape;
said central separate channel comprises a tubular element of said housing forming the radially inner wall of said second chamber; and sealing means is provided between said pressure-hose and the interior wall of said tubular element.

15. A termination as claimed in claim 11 and further comprising:

digitalizing and multiplexing electronic means mounted within said second chamber and operatively connected to each electrical conductor for converting the signals of each conductor.

16. A termination as claimed in claim 14 and further comprising:

digitalizing and multiplexing electronic means mounted within said second chamber and operatively connected to each electrical conductor for converting the signals of each conductor.

* * * * *